US010249208B2

(12) United States Patent
Lavallee et al.

(10) Patent No.: US 10,249,208 B2
(45) Date of Patent: Apr. 2, 2019

(54) SYSTEM AND METHOD FOR TRAINING AIRCRAFT PILOTS FOR SUDDEN-ONSET REDUCED-VISIBILITY CONDITIONS

(71) Applicant: AT Systems, LLC, Carrollton, TX (US)

(72) Inventors: Andre Gilles Lavallee, Lewisville, TX (US); Steven Tyson Phillips, Owasso, OK (US)

(73) Assignee: AT Systems, LLC, Carrollton, TX (US)

( * ) Notice: Subject to any disclaimer, the term of this patent is extended or adjusted under 35 U.S.C. 154(b) by 245 days.

(21) Appl. No.: 15/367,816

(22) Filed: Dec. 2, 2016

(65) Prior Publication Data
US 2018/0158356 A1    Jun. 7, 2018

(51) Int. Cl.
G09B 9/36      (2006.01)
G02C 7/10      (2006.01)
B64D 45/00     (2006.01)
G09B 9/44      (2006.01)
G01C 23/00     (2006.01)

(52) U.S. Cl.
CPC ............. G09B 9/36 (2013.01); B64D 45/00 (2013.01); G01C 23/00 (2013.01); G02C 7/101 (2013.01); G09B 9/44 (2013.01)

(58) Field of Classification Search
CPC ... G09B 9/36; G09B 9/44; G09B 9/30; G09B 9/307; B64D 45/00; G01C 23/00; G02C 7/01
See application file for complete search history.

(56) References Cited

U.S. PATENT DOCUMENTS

| | | |
|---|---|---|
| 2,522,938 A | 9/1948 | Francis et al. |
| 2,572,656 A | 10/1951 | Ortenburger |
| 2,694,263 A | 11/1954 | Francis et al. |
| 4,021,935 A | 5/1977 | Witt |
| 4,106,217 A | 8/1978 | Witt |
| 4,123,346 A | 10/1978 | Ploix |
| 4,152,846 A | 5/1979 | Witt |
| 4,279,474 A | 7/1981 | Belgorod |
| 4,283,177 A | 8/1981 | Kron et al. |
| 4,482,326 A | 11/1984 | Witt |
| 4,698,022 A | 10/1987 | Gilson |

(Continued)

Primary Examiner — Timothy A Musselman
(74) Attorney, Agent, or Firm — D. Tiller Law PLLC; Don Tiller

(57) ABSTRACT

A system and method for training a pilot to operate an aircraft in sudden-onset reduced-visibility conditions is disclosed. The system includes electrooptic material having an optical transmittance that varies with an electrical signal applied to the material and a power supply to provide the electrical signal to the material. The electrooptic material is disposed to restrict the pilot's visibility outside the aircraft when the electrooptic material is in a low-optical-transmittance state. The system further includes a flight-safety sensor that sets the output of the power supply to correspond to an optical transmittance state of the electrooptic material that does not substantially restrict the pilot's visibility outside the aircraft when flight conditions are deemed unsafe. The method includes reducing the optical transmittance of the material to restrict the pilot's visibility outside the aircraft in a manner unexpected to the pilot at the time of the transmittance reduction.

20 Claims, 11 Drawing Sheets

(56) References Cited

U.S. PATENT DOCUMENTS

| | | |
|---|---|---|
| 4,698,668 A | 10/1987 | Milgram |
| 5,103,110 A | 4/1992 | Housworth et al. |
| 5,252,069 A | 10/1993 | Lamb et al. |
| 5,276,539 A | 1/1994 | Humphrey |
| 5,308,246 A | 5/1994 | Balocco |
| 5,372,504 A | 12/1994 | Buechler |
| 5,478,239 A | 12/1995 | Fuerst et al. |
| 5,535,374 A | 7/1996 | Olive |
| 5,552,841 A | 9/1996 | Gallorini et al. |
| 5,846,085 A | 12/1998 | Witt |
| 6,039,390 A | 3/2000 | Agrawal et al. |
| 6,329,727 B1 | 12/2001 | Traveis et al. |
| 7,452,067 B2 | 11/2008 | Gross |
| 7,684,105 B2 | 3/2010 | Lamontagne et al. |
| 7,828,434 B2 | 11/2010 | Coulter et al. |
| 8,194,228 B2 | 6/2012 | Sato et al. |
| 8,622,544 B2 | 1/2014 | Brown et al. |
| 8,708,484 B2 | 4/2014 | Reichow et al. |
| 9,409,464 B2 | 8/2016 | Tomkins et al. |
| 9,454,022 B1 | 9/2016 | Sinopoli |
| 2003/0129567 A1 | 7/2003 | Cabato et al. |
| 2009/0317773 A1* | 12/2009 | Chapman .......... G09B 9/30 434/36 |
| 2012/0156655 A1 | 6/2012 | Goldberg |
| 2015/0115921 A1 | 4/2015 | Yang et al. |

\* cited by examiner training mode automatic transition to reduced-visibility mode manual transition to reduced-visibility mode automatic control mode

SYSTEM AND METHOD FOR TRAINING AIRCRAFT PILOTS FOR SUDDEN-ONSET REDUCED-VISIBILITY CONDITIONS

BACKGROUND

This invention generally pertains to systems and methods for training pilots to fly in sudden-onset reduced-visibility conditions (conditions with flight visibility of 5 miles or less, such as Degraded Visual Environments ("DVE"), unexpected departure from Visual Metrological Conditions ("VMC"), entry into Inadvertent Instrument Meteorological Conditions ("IIMC")). More specifically, the invention pertains to systems and methods that incorporate electrical control of the transparency of lens material to manually or automatically selectively occlude a pilot's vision to simulate the sudden onset of a reduced visibility environment.

The use of devices to restrict a pilot's vision to simulate reduced-visibility conditions for fly-by-instrument training is well known. Typically, the condition is simulated either by (1) using a device, such as glasses, a hood, or a visor, to restrict the pilot's view during a training flight or (2) controlling the visual environment in a flight simulator. Where the prior-art fails, however, is in providing a realistic simulation of an unexpected entry into a reduced-visibility environment, such as IIMC.

Improper pilot reaction to sudden-onset reduced visibility conditions results in significant loss of life, property, and business every year. Pilots, including specifically helicopter pilots, continue to unexpectedly enter reduced-visibility conditions. These events cause spatial disorientation and loss of aircraft control. These events often result in accidents, 70% of which are fatal. According to the National Transportation and Safety Board accident data, there were over 80 civilian helicopter accidents involving IIMC, with a 70% fatality rate and another 19% injury rate, in the time period between 2000 and 2014. Overall, 89% of the accidents involving IIMC result in injuries or fatalities. See National Transportation and Safety Board, *Aviation Accident Database and Synopses*, available at http://www.ntsb.gov/_layouts/ntsb.aviation/index.aspx. Based on the Department of Transportation's *Guidance on Treatment of the Economic Value of a Statistical Life—2015 Adjustment*, these accidents had a human cost of over $1.4 billion. See https://www.transportation.gov/sites/dot.gov/files/docs/VSL2015_0.pdf. This number does not include the related damage to property and equipment or lost revenue to business. The value of property, equipment, and business that was lost or harmed due to pilot response to the sudden onset of reduced-visibility conditions could exceed the $1.4 billion mark.

The accidents in sudden-onset reduced-visibility conditions are due in large part to the flawed procedures and technological limitations of pilot training. In the National Transportation and Safety Board's 2015 *Most Wanted List of Transportation Safety Improvements* report, enhanced public helicopter safety was a key issue. http://www.ntsb.gov/safety/mwl/Pages/mwl3_2015.aspx. Included in the report's recommendations were developing and implementing best practices for training flight crews for inadvertent flight into IMC conditions. The report also stated that training should be scenario-based. Unfortunately, there currently is no way to provide scenario-based training for Inadvertent IMC in an actual aircraft.

Currently there is no technology to simulate sudden-onset reduced-visibility conditions that provides the confusion, panic, disorientation and overall stress that comes when the visual environment is lost unexpectedly during flight. Research shows that surviving the first two minutes of the sudden-onset reduced-visibility event increases the survival rate significantly. This is the moment when the mental impact of the event is greatest. Current training techniques and equipment fail to prepare pilots to handle a sudden-onset reduced-visibility event because they fail to simulate the impact of the event on the pilot.

The most accepted technology for training pilots for sudden-onset reduced-visibility events, a flight simulator, does not properly prepare pilots for the actual event. This simulator training fails for a variety of reasons, including limited availability of simulator training, the simulator's failure to simulate the stress of an actual event, and the simulator's inability to simulate the spatial disorientation experienced in an actual event. Many pilots are rarely—if ever—able to use a simulator. And those pilots who have access to a simulator (typically commercial or military pilots) can use it at most a few times a year. Simulators do not effectively reproduce the stress of flying an actual aircraft where human life is at risk. This stress is an overwhelming factor in decision making during a true emergency. Perhaps most importantly—it is practically impossible to simulate spatial disorientation with a flight simulator. The signals the proprioceptive and vestibular systems send to the pilot's brain when the visual references are lost dictate how a pilot interprets an aircraft's attitude. Spatial disorientation is the leading cause of loss of control and is the single most important aspect that needs to be trained. The fact that most flight simulators today are non-motion simulators exacerbates the problem. Simply, these flight simulators do not accurately simulate a real-life sudden-onset reduced-visibility event.

Vision-restricting fly-by-instrument-training devices do not simulate the unexpected loss of the visual environment that leads to the stress and spatial disorientation of a sudden-onset reduced-visibility event. Because of this failing, aircraft (especially helicopters) continue to crash. People continue to die.

For example, U.S. Pat. No. 2,572,656 ("Ortenburger") discloses a device comprising two filters, either alone transparent but that together are opaque. The device is situated on the pilot such that when viewing the horizon and flight path of the aircraft, the pilot looks through both filters and when viewing instruments in the aircraft, the pilot looks through only a single filter. Thus, the pilot is able to view the instruments but is unable to see outside the aircraft. But the pilot using the Ortenburger device knows that his visibility will be reduced by using the device. That is, the Ortenburger device, while it simulates reduced-visibility conditions, does not simulate unexpected entry into such conditions.

Another vision-limiting device is disclosed in U.S. Pat. No. 2,694,263 ("Francis et al."). Like the Ortenburger device, the Francis et al. device is situated on the pilot to reduce visibility in certain directions. The Francis et al. device is generally opaque with transparent sections that allow the pilot to see the instruments or the horizon, but not both at once. But like the Ortenburger device, the Francis et al. device cannot replicate the disorientation that comes with unexpected entry into reduced visibility conditions because the pilot dons the device knowing that it will restrict her vision.

The vision limiting device disclosed in U.S. Pat. No. 4,021,935 ("Witt I") uses an electronically controlled LCD lens to limit a pilot's visibility based on the direction pilot is looking. The Witt I device determines the pilot's viewing direction by measuring the incident light on the device using a directed photocell. When the pilot looks at the aircraft's instruments, the photocell registers a low level of light and the lens is kept transparent. When the pilot looks to the horizon, the photocell registers a high level of light and the lens is made opaque. A similar device is disclosed in U.S. Pat. No. 4,152,846 ("Witt II"). The Witt II device uses multiple light sensors to better determine the pilot's viewing direction. The Witt I and Witt II devices cannot replicate the disorientation that comes with unexpected entry into reduced visibility conditions because the pilot dons the device knowing that it will restrict her vision when she looks at other than the instruments.

Another approach to reduced-visibility flight training is disclosed in U.S. Pat. No. 4,698,022 ("Gilson"). The Gilson device restricts the pilot's vision by placing a translucent material over glasses except for that portion of the glasses through which the pilot views the instruments. This reduces the pilot's vision other than to a narrow field designed to allow viewing of the aircraft instruments. The degree of translucency can be varied to simulate different visibility conditions by selecting different overlay materials. But the Gilson device fails to provide a mechanism to simulate unexpected entry into reduced visibility conditions because the pilot dons the device knowing that it will restrict her vision except for a narrow field.

Yet another approach to simulating reduced visibility conditions for pilots is disclosed in U.S. Patent Application Publication No. 2012/0156655 ("Goldberg"). The Goldberg device is a combination of a transparent polarized material to cover the windows of the cockpit and another transparent polarized material to cover the lens of a viewing shield such as glasses worn by the pilot. The window polarization is orthogonal to the lens polarization such that when the pilot dons the polarized viewing shield, he cannot see through the polarized windows. As with the previously described prior-art approaches, the Goldberg device fails to provide a mechanism to simulate unexpected entry into reduced visibility conditions because the pilot dons the device knowing that he will not be able to see outside the aircraft.

The prior-art approaches to simulating reduced-visibility conditions fail in at least one important way. They do not accurately simulate the confusion, panic, disorientation, proprioceptive, and vestibular sensations that come from unplanned entry into such conditions. That is, a pilot reacts differently to inadvertent entry into a reduced-visibility condition than she does to planned entry into such a condition. And this difference may leave the pilot unprepared for reality, regardless of her training, and reduce her ability to properly react in such conditions. Improper reaction to unexpected reduced-visibility conditions may lead to fatalities, injury, and property damage. The prior-art approaches do not adequately simulate inadvertent entry into reduced-visibility conditions.

Accordingly, there is a need for a system and method for more accurately simulating sudden-onset reduced-visibility events.

SUMMARY

The present invention is directed to technology to satisfy the need to train pilots to properly respond when they unexpectedly enter reduced-visibility conditions.

In one aspect of the invention, a method for training a pilot to operate an aircraft in sudden-onset reduced visibility conditions includes providing a device to selectively restrict the pilot's view outside the aircraft and operating the device to restrict the pilot's view outside the aircraft in a manner unexpected to the pilot. The device includes an electrooptic material having an optical transmittance that varies with an applied electrical signal, such as a current or voltage level. The device is operated by providing an electrical signal to the electrooptic material using a power supply, and altering the output of the power supply such as to change the optical transmittance state of the electrooptic material to correspond to a lower optical transmittance state and thereby restrict the pilot's visibility outside the aircraft. Because the transmittance is decreased at a time and in a manner not known to the pilot before the transmittance is changed, the change in transmittance simulates a sudden-onset reduced-visibility event.

In another aspect of the invention, the method for training the pilot further includes automatically operating the vision-limiting device to set the optical transmittance state at high level such that the vision-limiting device does not substantially restrict the pilot's visibility outside the aircraft. The automatic operation is effected using a flight-safety sensor (i.e., a sensor that monitors flight characteristics of the aircraft or of the pilot) that provides a signal to the power supply that causes the power supply to output the electrical signal that corresponds to the high-transmittance state. Because the flight-safety sensor monitors conditions indicative of the safety of the flight (such as altitude and roll/bank angle of the aircraft and heart rate and blood pressure of the pilot), the automatic operation of the vision-limiting device is based on conditions that are predetermined to be indicative of unsafe flight conditions, and the reduced-visibility training is automatically halted under such conditions.

In another aspect of the invention, a vision-limiting device includes an electrooptic material having an optical transmittance that varies with an applied electrical signal, a power supply to provide an electrical signal to the electrooptic material, and a flight-safety sensor to provide the power supply with information indicative of the safety of the flight conditions. The optical transmittance of the vision-limiting device is controlled by controlling the output of the power supply. The output of the power supply is automatically set to a high-optical-transmittance state when the flight-safety sensor provides a signal indicative of unsafe flight conditions.

In another aspect of the invention, a device for training a pilot to operate an aircraft in sudden-onset reduced-visibility conditions includes an electrooptic material having an optical transmittance that varies with an applied electrical signal, a power supply to provide an electrical signal to the electrooptic material, and a GPS monitor to provide the power supply with information indicative of the altitude of the aircraft. The device can be used to limit the pilot's vision outside the aircraft by setting the output of the power supply to correspond to a low-optical-transmittance state of the electrooptic material. The output of the power supply is automatically set to a high-optical-transmittance state when the GPS monitor provides a signal indicative of unsafe altitude conditions. In another aspect of the invention, the training device further includes an aircraft-orientation sensor (such as an accelerometer or gyroscope) that provides the power supply with information indicative of the roll/bank angle or pitch of the aircraft. The output of the power supply is automatically set to a high-optical-transmittance state when the aircraft-orientation sensor provides a signal indicative of unsafe roll/bank or pitch conditions.

BRIEF DESCRIPTION OF THE SEVERAL VIEWS OF THE DRAWING

These and other features, aspects, and advantages of the present invention will be become better understood with reference to the following description, appended claims, and accompanying drawings where:

DETAILED DESCRIPTION OF THE INVENTION

Figure 1A:
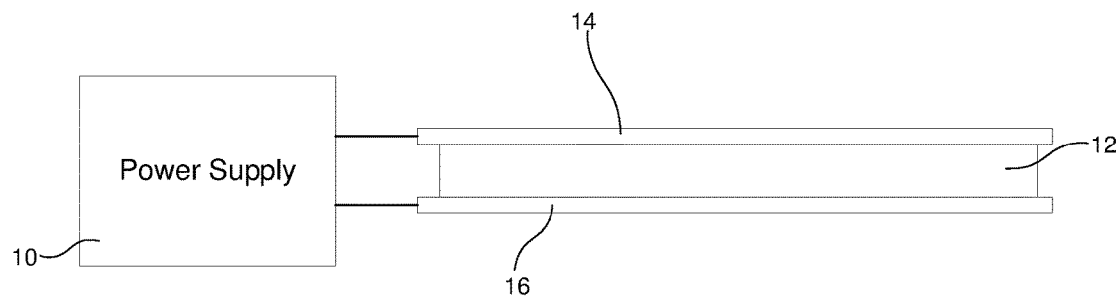
FIGS. 1a-1e illustrate various approaches to electrically controlled optical material (electrooptic material, some variants referred to as "switchable glass" or "smart windows").

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature to convey that structural nature of that feature. Such reference to function of a structural feature is not reference to an instance of use of the invention.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently to a feature that is "exact." For example, a component is "substantially" opaque if the optical transmittance of the component is such as to equivalently satisfy the technological purpose the component being exactly opaque.

Except as otherwise stated herein, or as is otherwise clear from context, the term "or" is used herein in its inclusive sense. For example, "A or B" means "A or B, or both A and B."

As used herein, "electrooptic material" refers to a material with optical characteristics that can be electrically controlled.

As used herein, "optical transmittance" refers to the amount of light transmitted through a material expressed as a percentage of the amount of light incident on a material.

As used herein, "optical apparel" refers to an optical device configured to be worn by a person, such as eyeglasses, goggles, and flight-helmet visors.

In the context of entry into reduced-visibility conditions, "unexpected" refers to the pilot's expectations at the exact moment of entry into such conditions. For example, while the pilot may expect that at some moment he may enter into such conditions he does not know at any given moment whether he will enter into such conditions at that moment.

Electrooptic materials are well known in the art. In particular, electrooptic materials having an optical transmittance that can be controlled by applying a voltage or current to the material are well known in the art. These materials include "switchable glass" and "smart windows." For certain electrooptic materials, the transmittance can be changed between a minimum and maximum transmittance with application of a voltage or current. Other electrooptic materials have a transmittance that varies somewhat continuously with the applied voltage or current. Electrooptic materials include Polymer Dispersed Liquid Crystals (PDLCs), Suspended Particle Devices ("SPDs"), electrochromic devices, and micro-blinds.

FIG. 1a depicts a basic circuit for a voltage-controlled electrooptic material. An electrooptic material 12 is disposed between two electrodes 14, 16. The electrodes 14, 16 are connected to the output terminals of a power supply 10. The power supply 10 provides an electrical signal (e.g., AC or DC voltage) across the terminals such that the electrodes 14, 16 provide the signal to the electrooptic material 12. The power supply 10 may be a fixed-output power supply; i.e., a power supply having an output voltage that is not variable other than to be on or off (e.g., a power supply that outputs 12 VAC when on and 0VAC when off). The power supply 10 may be a programmable-output power supply (also known as a programmable power supply); i.e., a power supply having an output voltage that depends on an input, such as current, frequency, or data. Both fixed-output power supplies and programmable-output power supplies are well-known in the art.

Figure 1B:
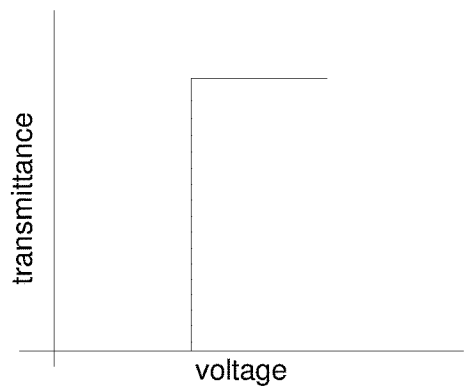
Figure 1C:
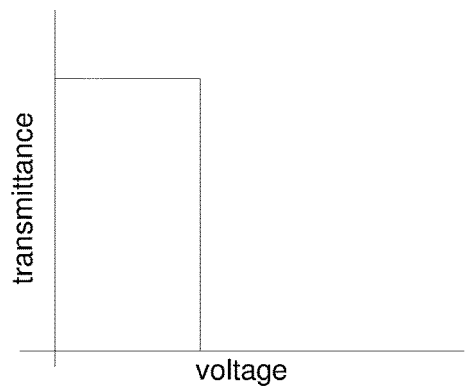
Figure 1D:
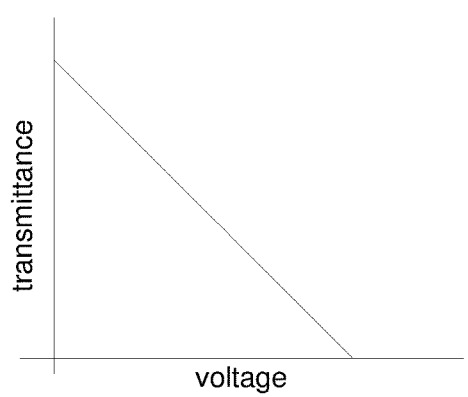
Figure 1E:
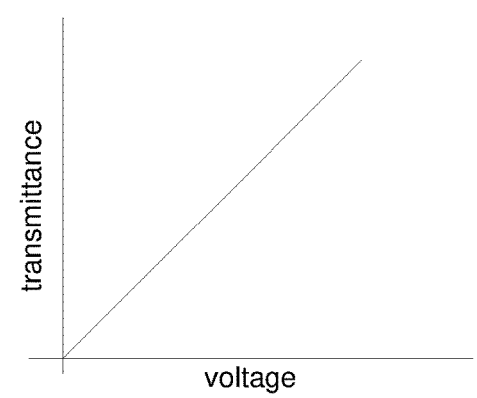

FIGS. 1b-1d depict idealized transmittance-vs-voltage response curves for various electrooptic materials. In general, the transmittance of an electrooptic material can depend on the applied voltage in a number of ways, depending on the material. The idealized curve of FIG. 1b represents a material that is substantially opaque when the applied voltage is below a certain level and has a constant non-zero transmittance when the voltage is at or above the level. The idealized curve of FIG. 1c represents a material that has a constant non-zero transmittance when the applied voltage is below a certain level and is substantially opaque when the voltage is at or above the level. The idealized curve of FIG. 1d represents a material that has a transmittance that varies inversely with the applied voltage and the idealized curve of FIG. 1e represents a material that has a transmittance that varies with the applied voltage. Some electrooptic materials will have a transmittance that changes with application of a voltage and then remains constant at the new level when voltage ceases to be applied and until a voltage is again applied.

The curves depicted in FIGS. 1b-1e are idealized. The actual transmittance curves may vary from the ideal. For example, the idealized curves of FIGS. 1b and 1c show a sharp switch from the substantially transparent state to the substantially opaque state. The actual response will typically have a more gradual transition from state to state. Similarly, the idealized curves of FIGS. 1d and 1e are depicted as linear. The actual curves need not be linear. The idealized curves are presented for a basic explanation of background principles well known in the art of electrooptic materials and are not intended to limit the invention.

Figure 2A:
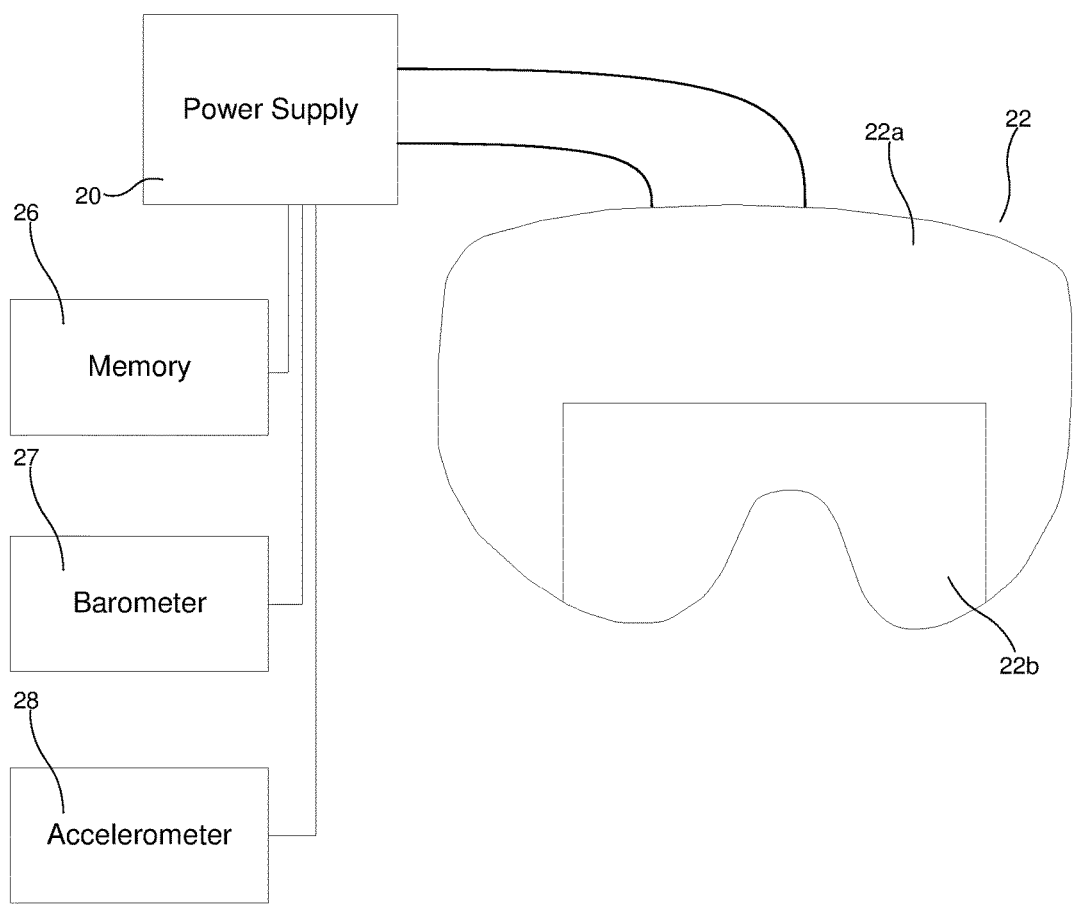
FIGS. 2a and 2b illustrates an exemplary embodiment of a vision-limiting device according to the invention.
Figure 2B:
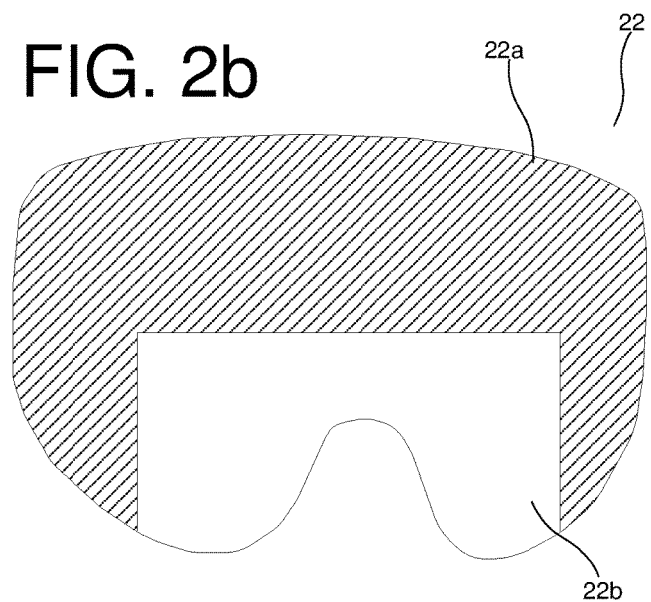

An exemplary embodiment of a vision-limiting device according to the invention is depicted in FIG. 2a. A lens 22 comprises a portion of electrooptic material 22a and a portion of transparent material 22b. The electrooptic material 22a may be disposed on or in a transparent lens substrate or may act as the lens substrate. The lens 22 is configured to be donned by the pilot. For example, the lens may be used to form or fit on the lens portion of glasses or goggles worn by the pilot, the visor portion of flight helmet worn by the pilot, or the lens portion of night vision goggles worn by the pilot. The transparent material 22b is configured such as to allow the pilot to view the aircraft's instruments regardless of the optical transmittance state of the electrooptic material 22a. The electrooptic material 22a is configured such as to reduce the pilot's vision other than through the transparent material 22b by reducing the optical transmittance of the electrooptic material 22a. The lens 22 is depicted in FIG. 2b with the electrooptic material 22a in the substantially opaque state.

A power supply 20 is connected to the electrooptic material 22a in the manner described with reference to FIG. 1a. The optical transmittance of the electrooptic material 22a can be manipulated according to the transmittance-vs-voltage response curve for the material 22a. The output of the power supply may be controlled manually, or it may be controlled automatically using output levels that are stored in memory 26 (e.g., volatile memory, such as random-access memory, or nonvolatile memory, such as flash memory or magnetic disk). Thus, the field of the pilot's view may be restricted by changing the output of the power supply to a voltage that corresponds to a lower transmittance state of the material 22a. This change may be performed manually by someone other than the pilot, for example, by the training pilot. Or the change may be automatic based on a power-supply output profile stored in memory 26. In this way, the vision-limiting device may be used to simulate the unexpected entry into reduced-visibility conditions.

The power supply 20 may be connected to safety sensors that provide information to control the output of the power supply and thereby the optical transmittance state of the electrooptic material 22a. For example, the power supply 20 may be connected to a barometer 27 and the transmittance state of the material 22a is controlled by the pressure reading from the barometer 27. For example, the transmittance state may be set to maximum transmittance for air pressures above a certain reading (corresponding to low altitudes). Or the transmittance state may be set to maximum transmittance for a change in air pressure greater than some value per unit time (such as might occur in a rapid decent). Likewise, the power supply 20 may be connected to an accelerometer 28 to control the transmittance state of the material 22a based on current acceleration or changes in acceleration (such as might occur in a spinning or rotating aircraft). The power supply 20 may be connected to other devices, such as an airspeed indicator, altimeter, and any of the various sensors found in an aircraft. In this way, the transmittance state may be tied to different measures of flight conditions.

The sensors connected to the power supply 20 are used to implement training safety measures. For example, a barometer 27 may be used as a safety device that disables the vision-limiting capability of the vision-limiting device under certain conditions, such as a too-rapid descent or a too-close proximity to the ground. An altimeter, GPS monitor, or other altitude sensor would function similarly. Similarly, an accelerometer 28 may be used to disable the vision-limiting capability of the vision-limiting device when acceleration exceeds some predetermined level. Other measures that may be used to disable the vision-limiting device include GPS position (which may include altitude information), oil pressure, aircraft electrical power, fuel level, among other aircraft performance measures. Pilot performance measures, such as heart rate and blood pressure may be similarly used. For example, the vision-limiting device may be disabled if the pilot's heart rate or blood pressure exceeds some predetermined threshold. In this way, the transmittance state may be set so that the vision-limiting device does not interfere with the pilot in circumstances under which such vision interference may pose unacceptable risks to safety.

The power supply 20 may also be controlled to automatically trigger the simulation of unexpected entry into reduced visibility conditions based on safety-sensor input. For example, a timer connected to the power supply 20 may change the optical transmittance state of the electrooptic material 22a based on time from some event, such as reaching a certain altitude or airspeed. In this way, the transmittance state may be set to safely simulate unexpected entry into reduced-visibility conditions without manual manipulation by a training pilot.

While the memory 26, barometer 27, and accelerometer 28 are depicted in this exemplary embodiment as separate from the power supply 20, they, and other sensors and components, may equivalently be included within the power supply 20.

Figure 3:
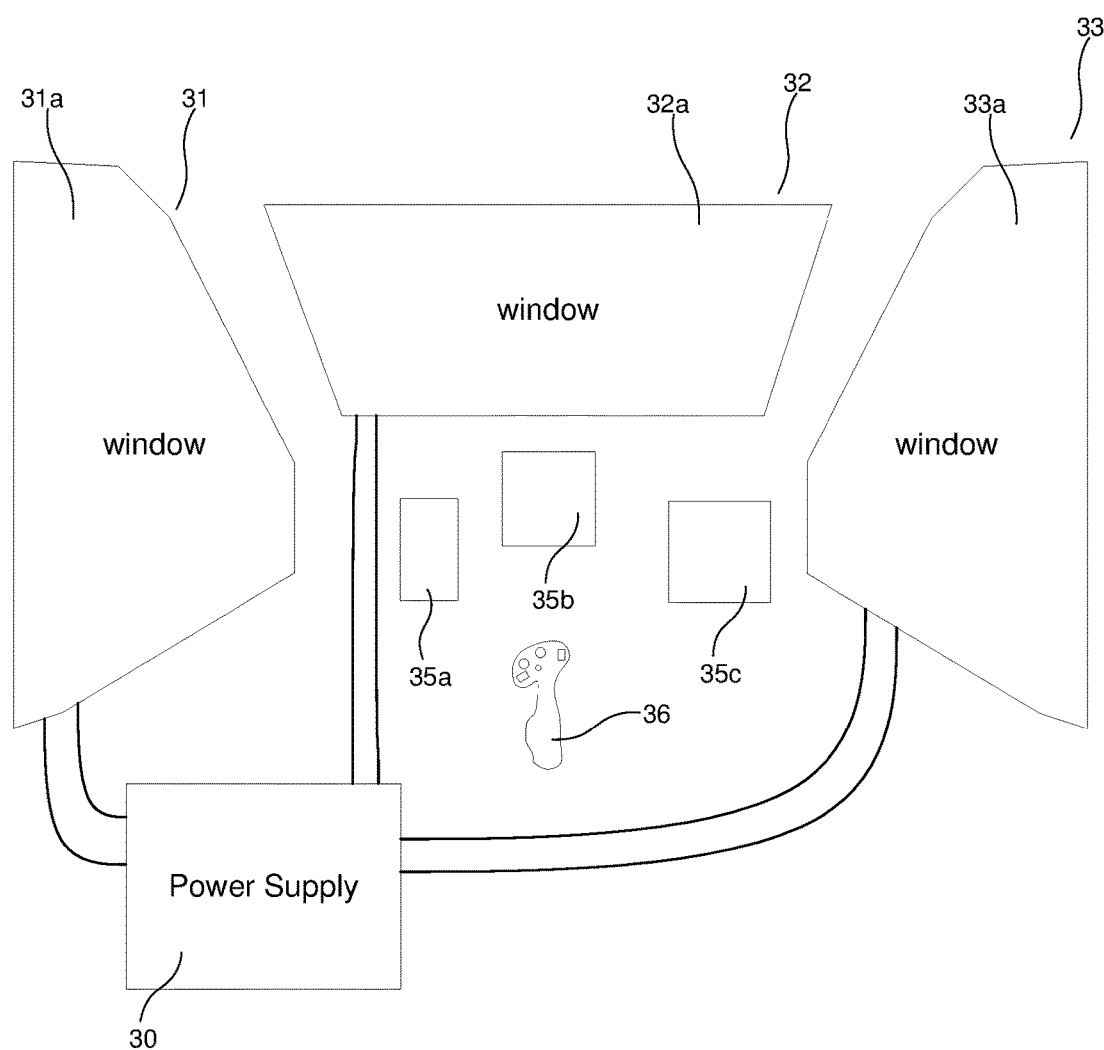
FIG. 3 illustrates an exemplary embodiment of a vision-limiting device according to the invention as disposed within the cockpit of an aircraft and as viewed from the pilot's perspective.

Another exemplary embodiment of a vision-limiting device according to the invention is depicted in FIG. 3. The vision-limiting device is disposed within the cockpit of an aircraft. The cockpit is depicted with three windows 31, 32, 33. Each window comprises or consists of an electrooptic material 31a, 32a, 33a. Each electrooptic material 31a, 32a, 33a is connected to a power supply 30 in the manner described with reference to FIG. 1a above. Operation of the power supply 30 to selectively limit the pilot's vision to simulate unexpected entry into reduced-visibility conditions is generally the same as described with reference to FIGS. 2a and 2b above. This embodiment includes multiple instances of electrooptic material 31a, 32a, 33a the transmittance state of which may be separately controlled to limit vision in certain directions and not others, or to limit vision differently in certain directions and not others. Such a cockpit-disposed embodiment does not require multiple instances of electrooptic material. For example, one instance of the material may be disposed on all the windows or between the pilot and the windows. Similarly, the lens embodiment of FIG. 2a may include more than one instance of electrooptic material that may be separately controlled as depicted in FIG. 3. For example, glasses or goggles that have two separate lenses may have two separate instances of electrooptic material that may be separately or jointly controlled.

Various flight instruments 35a, 35b, 35c and a control stick 36 are also depicted in FIG. 3. As these are within the cockpit, the pilot's view of these will not be limited by the transmittance state of the electrooptic materials 31a, 32a, 33a. The power supply 30 may be connected to or include memory or safety sensors as described with reference to FIG. 2a above. The connected sensors may include the flight instruments 35a, 35b, 35c and the control stick 36. For example, a control-stick sensor may indicate whether the pilot has released the control-stick and, if so, disable the vision-limiting device.

Figure 4:
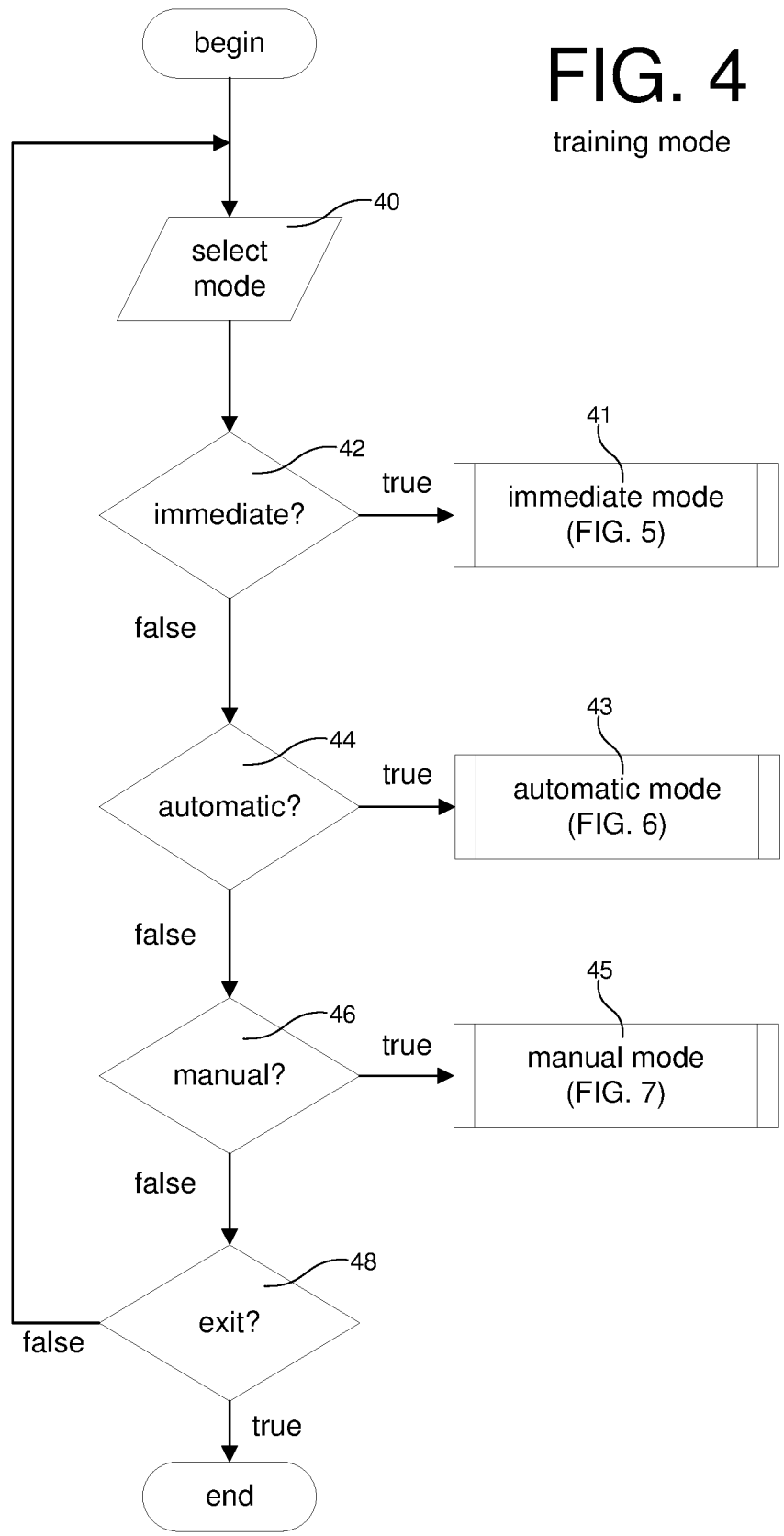
FIGS. 4-7 illustrate exemplary flows for training a pilot to handle a sudden-onset reduced-visibility event.
Figure 5:
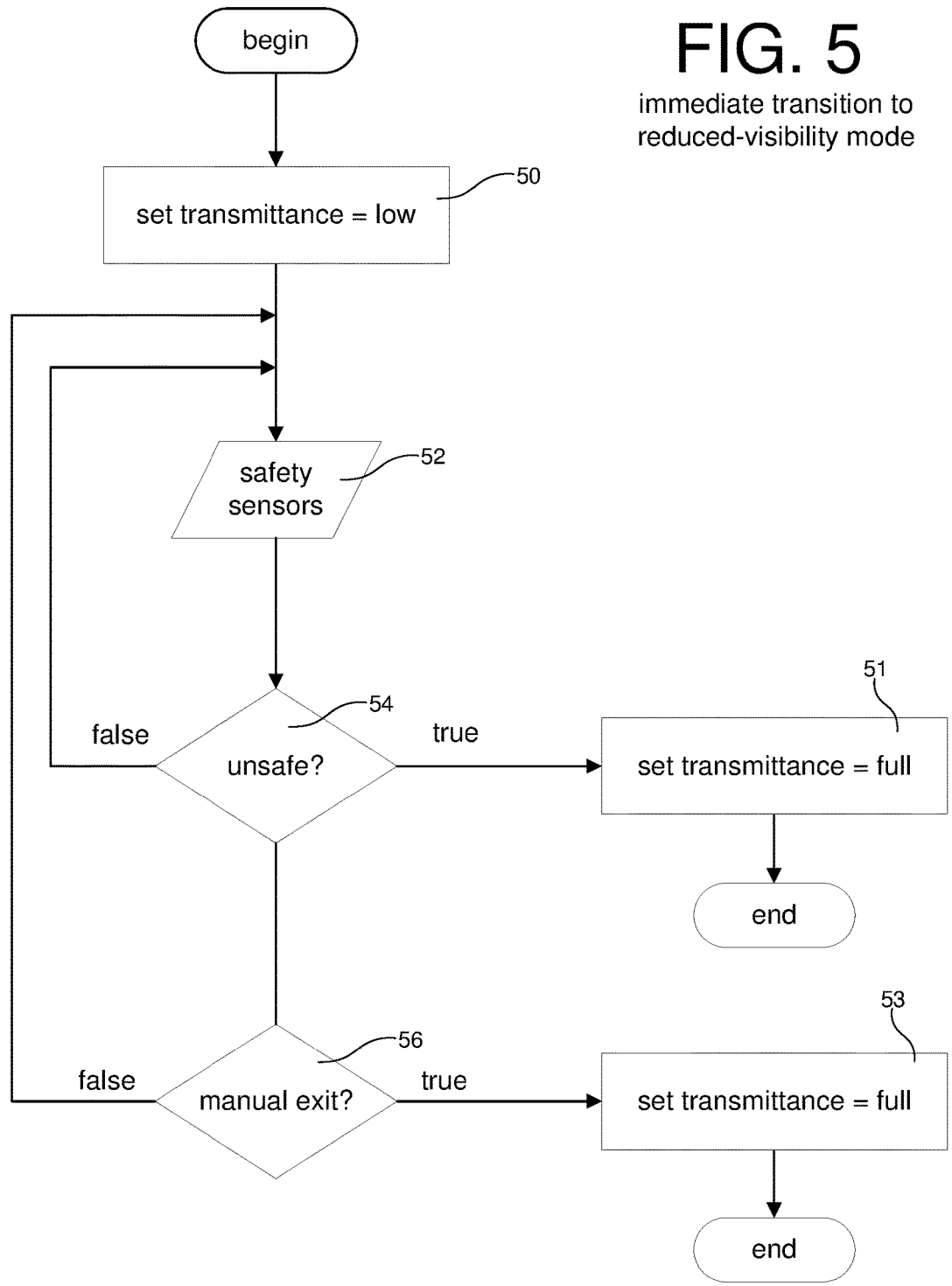
Figure 6:
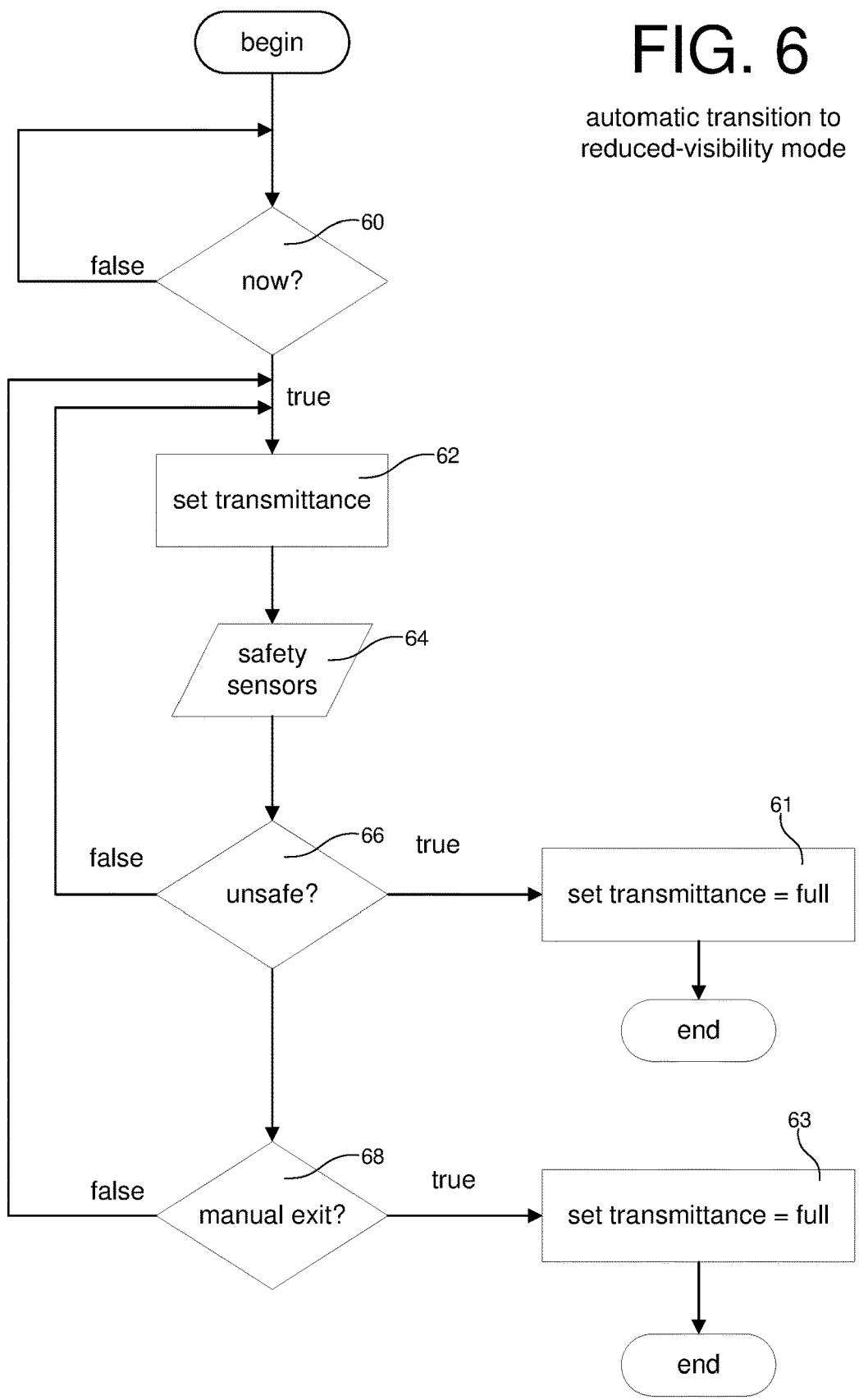
Figure 7:
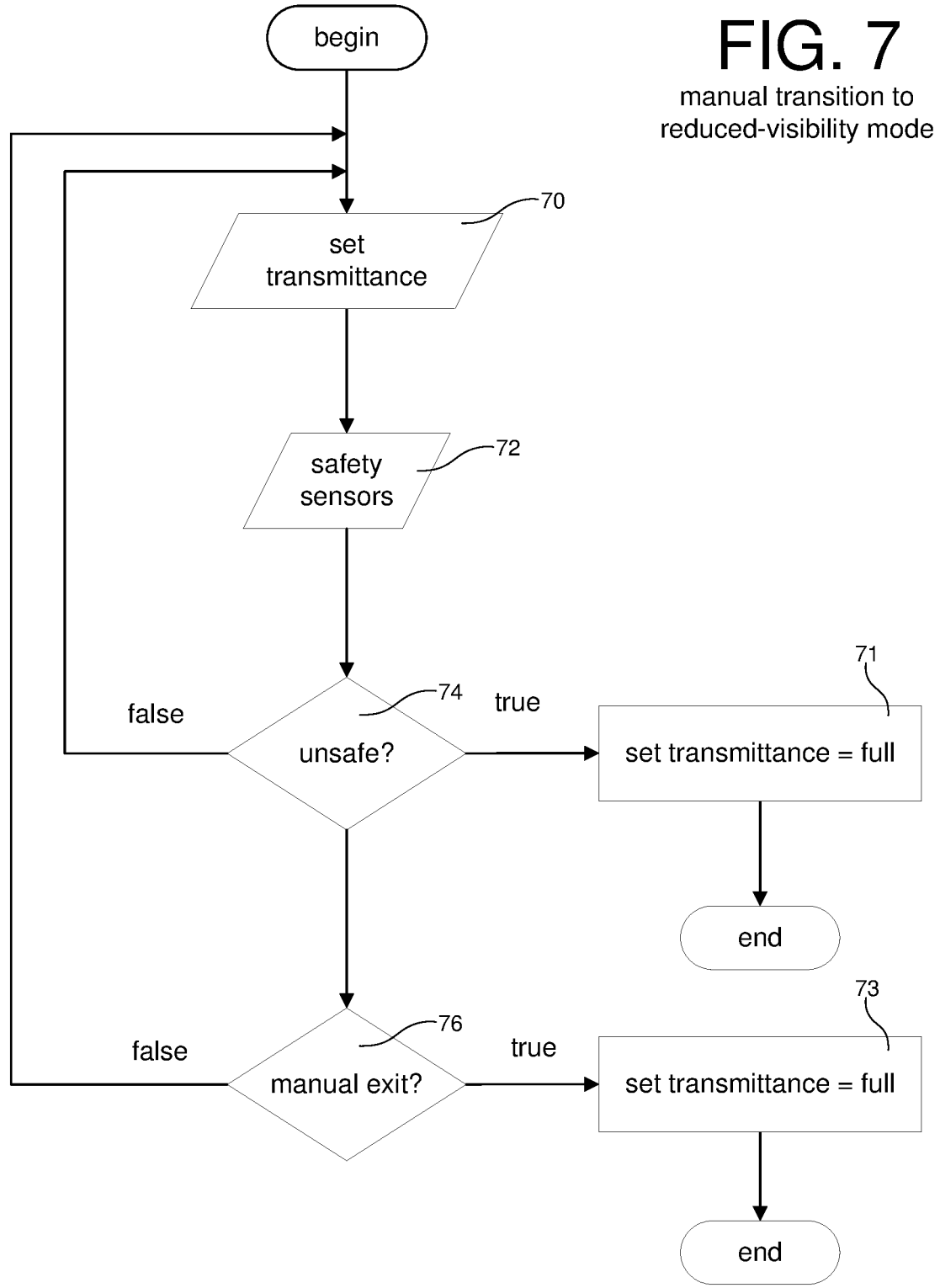

Exemplary training flows are shown in FIGS. 4-7. As shown in FIG. 4, the pilot or the trainer may select the training mode 40. Three training modes 42, 44, 46 are depicted in this flow: immediate 41, automatic 43, and manual 45. If the immediate mode 41 is selected, as determined at the "immediate?" decision step 42, the flow depicted in FIG. 5 is invoked. If the automatic mode 44 is selected, as determined at the "automatic?" decision step 44, the flow depicted in FIG. 6 is invoked. If the manual mode 45 is selected, as determined at the "manual?" decision step 46, the flow depicted in FIG. 7 is invoked. The selection mechanism may be implemented in hardware (e.g., a four-position switch or a series of switches) or software (e.g., a "switch" statement or a series of "if . . . then" statements based on user input). Alternatively, a given system may provide other training-mode options, such as only the immediate and manual modes, only the manual mode, or a custom mode. The training modes differ in how the transmittance of the electrooptic material is varied to occlude the pilot's vision to simulate a sudden-onset reduced-visibility event.

An exemplary immediate training mode 41 is depicted in FIG. 5. In this mode, the transmittance of the electrooptic material is directly set to a low value 50, such as substantially opaque. This means the power supply is set to output the voltage corresponding to the low-transmittance state using a slope (change in output voltage per unit time) that is dictated by the system (including the power supply, electrooptic material, and the connections) rather than by a training goal. Any safety sensors incorporated into the training process will be periodically read 52 and their values will be compared with predetermined values 54. If the comparison indicates that the continued reduced visibility is unacceptable, the electrooptic material will be set to a maximum transmittance state 51 and the training event will end. For example, if the altitude of the aircraft is below some minimum height or above some maximum height, the training event will be deemed unsafe and will automatically end. This can be expressed in pseudocode as "if sensor_altitude<minimum_altitude or sensor_altitude>maximum_altitude, then transmittance=full, end training." The training mode may also be terminated manually 56, 53, for example, by engaging or disengaging a hardware or software switch. While the immediate mode is described here as including a single transmittance state, it may optionally include multiple transmittance states as explained below. In this immediate mode, a trainer triggers the reduced-visibility event so that the pilot-in-training does not know her vision is going to be limited at the moment it is limited. In this way, the immediate training mode simulates the sudden onset of a reduced-visibility event.

An exemplary automatic training mode 43 is depicted in FIG. 6. In this mode, the moment that the pilot's visibility is reduced is determined in a pseudorandom fashion 60. Whether to start the reduced-visibility event may be based on, for example, time since take off or time since reaching a particular altitude. In this example, the amount of time would be unknown to the pilot and may, for example, be randomly selected within certain parameters or set before the training flight. As shown in FIG. 6, this mode may also include changing the transmittance over time in a particular controlled fashion. Once the reduced-visibility event has begun, the transmittance of the electrooptic material may be periodically set to different values 62. The transmittance setting may also persist over the duration of the training event. Data from safety sensors 64 maybe periodically checked 66 to determine if the aircraft is being operated in an unsafe condition, and, if so, the transmittance will be set to full 61 and the training event terminated as explained above. Also as explained above, the training event may be terminated manually 68, 63. While the periods of transmittance changes, safety checks, and manual-exit checks are shown as the same in FIG. 6, these need not be the same. For instance, a manual exit may be accomplished at any point via a manual switch or through software interrupt processing. And the transmittance may be varied more or less often than the safety sensors are checked. The key to the automatic mode is that the pilot does not know exactly when her vision will be reduced once the training event begins. In this way, the automatic training mode simulates the sudden onset of a reduced-visibility event.

An exemplary manual training mode 45 is depicted in FIG. 7. This mode differs from the previously described immediate mode in that the trainer manually sets the transmittance of the material 70. This may be done, for example, by manually manipulating a hardware control (such as a knob controlling a potentiometer) or a software control (such as a dial on a graphic user interface that sets the power supply output). Data from safety sensors 72 maybe periodically checked 74 to determine if the aircraft is being operated in an unsafe condition, and, if so, the transmittance will be set to full 71 and the training event terminated as explained above. Also as explained above, the training event may be terminated manually 76, 73. The key to the manual mode is that the pilot does not know exactly when her vision will be reduced. In this way, the manual training mode simulates the sudden onset of a reduced-visibility event.

Figure 8:
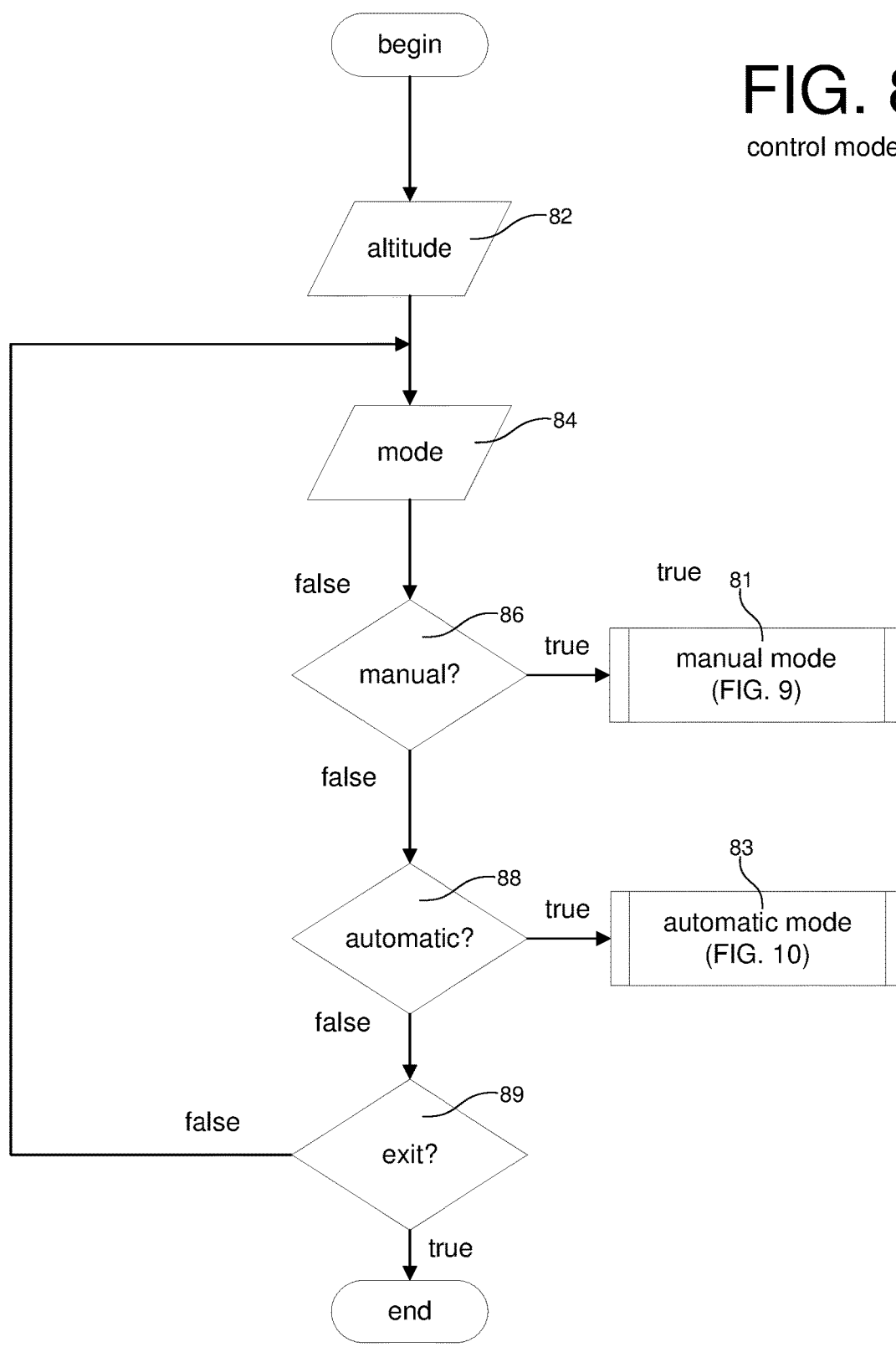
FIGS. 8-10 illustrate exemplary flows for setting a power-supply/control unit.
Figure 9:
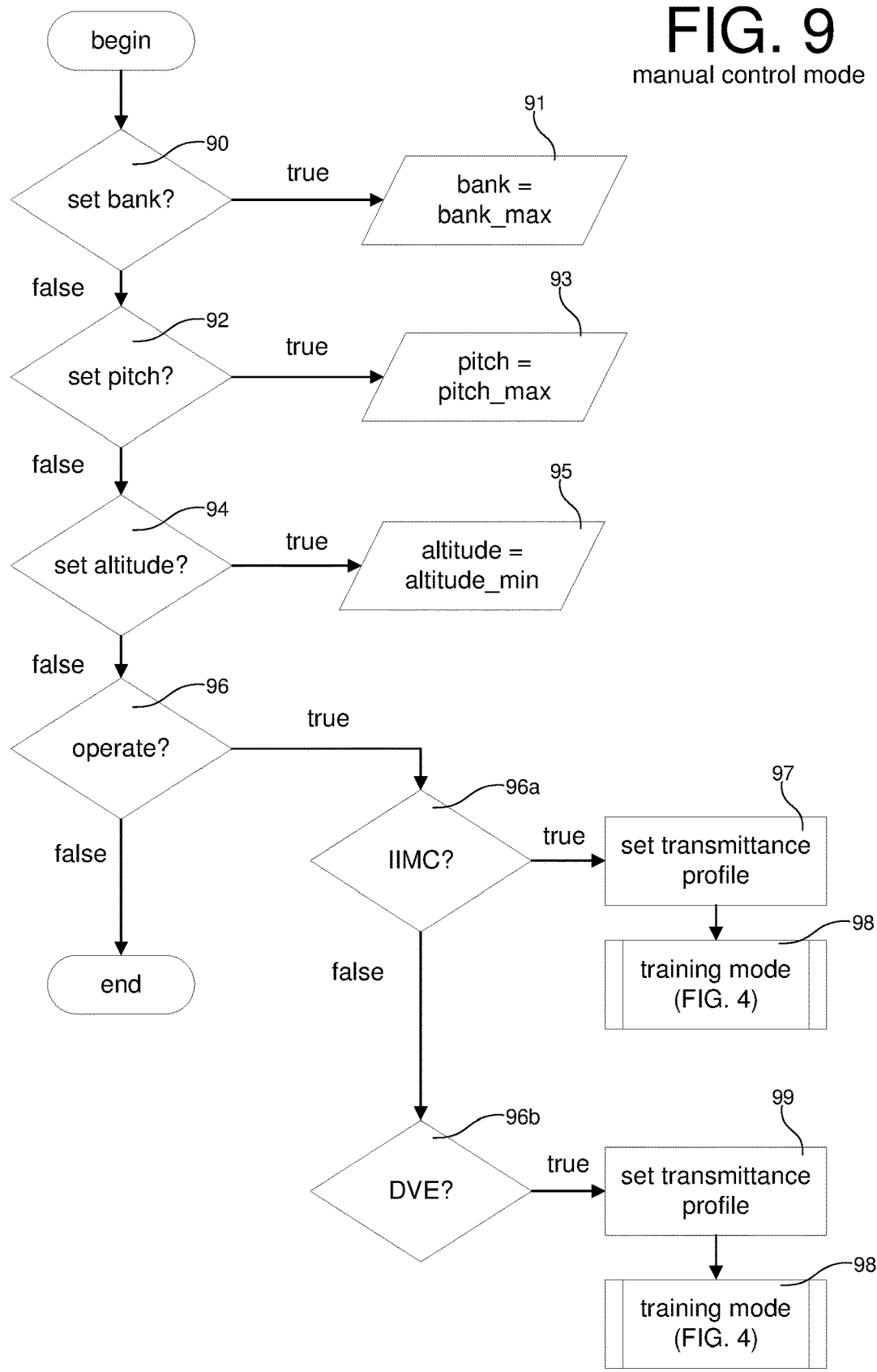
Figure 10:
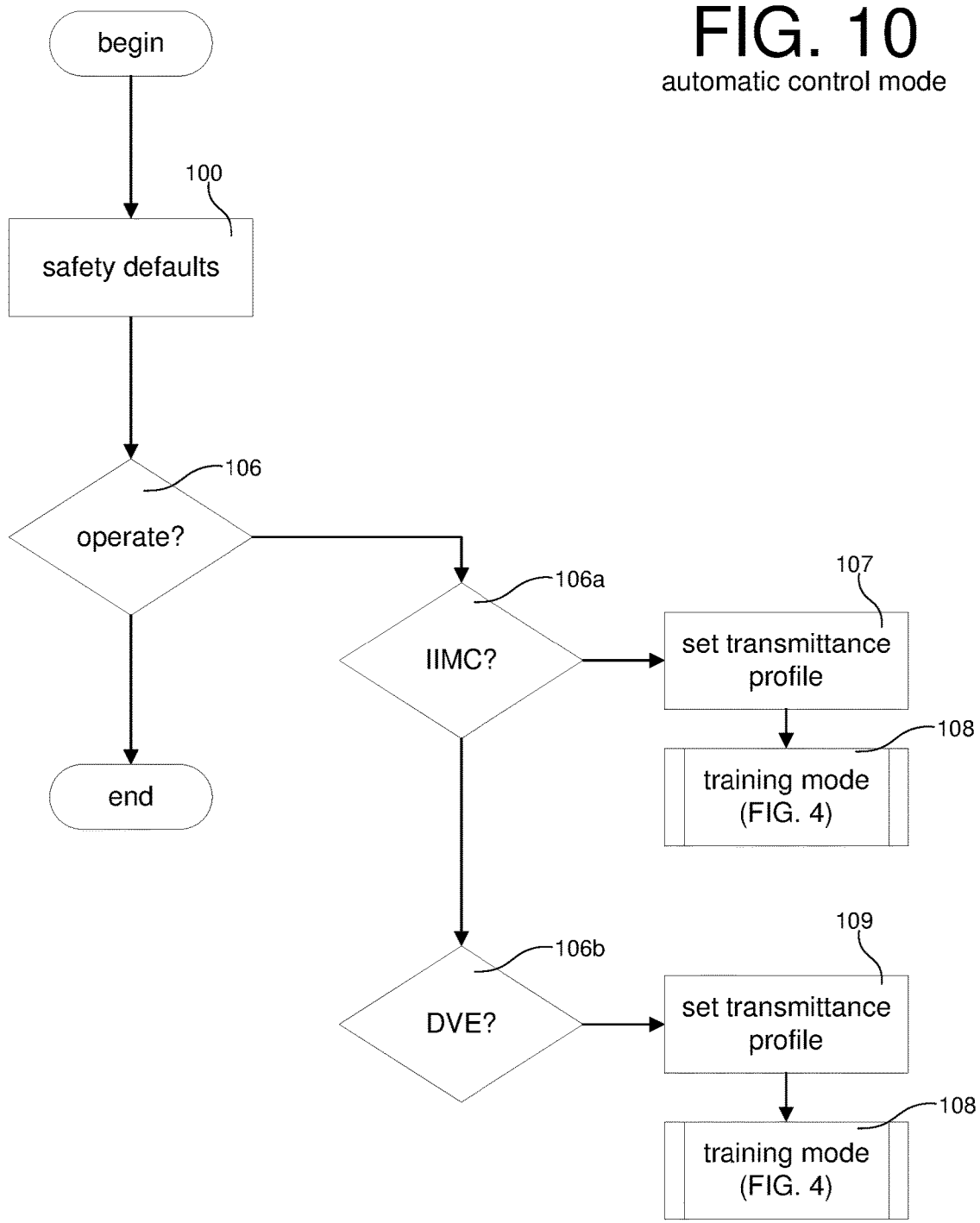

Exemplary control flows are depicted in FIGS. 8-10. As shown in FIG. 8, the altitude value is measured 82 and the control mode is selected or entered 84. The control mode may be selected through hardware (e.g., switch) or software (e.g., input data, menu selection). Two exemplary modes are depicted in FIG. 8: a manual mode 81 and an automatic mode 83. The modes differ in how the safety criteria are set.

An exemplary manual control mode 81 is depicted in FIG. 9. The user may independently select and set the safety criteria used in the training mode. Here, the maximum aircraft roll/bank angle may be set 90, 91, the maximum aircraft pitch angle may be set 92, 93, and the minimum aircraft altitude may be set 94, 95. Once the safety criteria are selected and set, the user may choose to enter a training event or to exit 96. If the user selects to begin a training event, he may choose among different types of training events (e.g., IIMC 96a and DVE 96b). The type of training event determines the transmittance-versus-time profile used in the training mode 97, 99. The transmittance-versus-time profile may be selected or entered by the user, or may be set by default according to the type of event. For example, a DVE training event may include transmittance-versus-time profile options associated with light, medium, and heavy environments (progressively less transmittance, respectively). Once the transmittance profile is set, the system proceeds to a training-mode flow as previously described.

An exemplary automatic control mode 83 is depicted in FIG. 10. This differs from the exemplary manual control mode of FIG. 9 in that safety criteria are selected and set 100 by default. This may be a factory default or may be a user-defined default. A user may define default safety criteria by, for example, uploading a text or binary file with the measurement type and value or by saving as the default a configuration established in the manual control mode.

Figure 11:
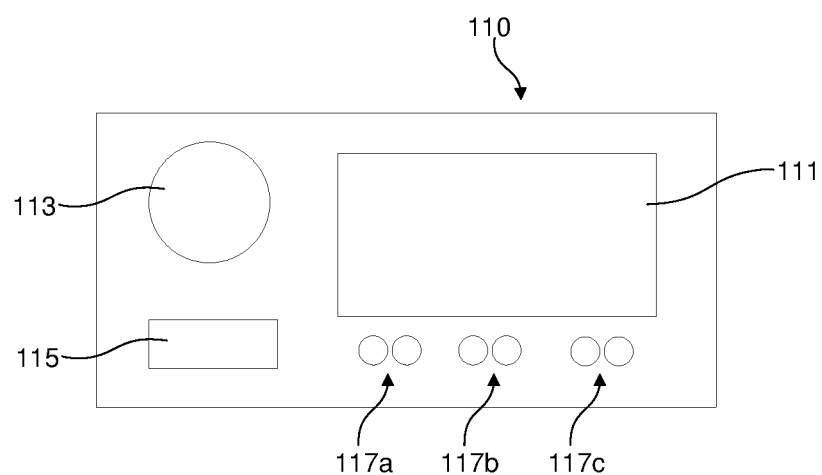
FIG. 11 illustrates an exemplary power supply/control unit.

An exemplary power-supply/control unit 110 is depicted in FIG. 11. It includes a display 111, a control knob 113, a programmable button 115, and power-output ports 117a, 117b, 117c. The unit 110 may be powered by either AC or DC power. The unit 110 includes a standard programmable power supply to convert the supply voltage/current to the programmed output voltage/current for the electrooptic material.

The unit 110 also includes sensors to measure pitch and roll/bank (e.g., gyroscopes and accelerometers), a GPS unit, and associated support circuitry for the sensors and unit (e.g., discrete circuits, application-specific ICs, programmable logic, processor). The GPS unit provides position, velocity, and altitude information. The gyroscope and accelerometers provide pitch and roll/bank information. The gyroscope may be any of the various gyroscope forms, such as a mechanical gyroscope, a MEMS gyroscope, a fiber optic gyroscope, a digital gyroscope, and a ring laser gyroscope. Likewise, the accelerometer may be any of the various forms of accelerometers, such as a laser accelerometer, a magnetic-induction accelerometer, an optical accelerometer, and a strain-gauge accelerometer.

The unit 110 may also include a communications interface by which the unit 110 can communicate with external computers or sensors. For example, the unit 110 may communicate with a computer or sensor via a general purpose interface bus (GPIB), Ethernet, universal serial bus (USB), or Wi-Fi. Such a configuration may be used, for example, to pass control of the power supply to an external computer or to use safety sensors not integral to the unit 110.

The power-supply/control unit 110 is turned on by pressing and holding the control knob 113 for two to three seconds. When on, the display 111 will show a welcome message for three to six seconds. This welcome screen is followed by a power-level screen visible for two to three seconds. Then a current altitude will be shown for three to five seconds.

The display 111 then shows a prompt for the user to select manual control or automatic control, such as "Operation Mode?" with "Man or Auto." "Man" or "Auto" may be selected by rotating the control knob 113 to appropriately position a cursor and by pressing the control knob 113 to select highlighted option. If "Man" is selected, the next screen shows "Custom Safety Settings?" with the words "YES or NO." "YES" or "NO" may be selected by rotating the control knob 113 to appropriately position the cursor and by pressing the knob 113 to select highlighted option. If "NO" is selected, the safety settings are set to the default of roll/bank angle=45 degrees, pitch angle=15 degrees, and altitude=300 feet above the altitude at the time the power-supply/control unit 110 is powered on. If "YES" is selected, then the next screen will display "ROLL/BANK?" The maximum roll/bank angle may be entered by rotating the knob 113 until the desired maximum roll/bank angle is displayed then pressing the knob 113 to accept the value. The next screen displays "PITCH?" The maximum pitch angle may be entered by rotating the knob 113 until the desired maximum pitch angle is displayed then pressing the knob 113 to accept the value. Optionally, the power-supply/control unit 110 may assign the negative of the entered maximum pitch angle as the minimum pitch angle (e.g., entry of 30 degrees sets the maximum pitch angle to 30 degrees and the minimum pitch angle to −30 degree) or the unit 110 may separately prompt for entry of a minimum pitch angle (e.g., "MAX PITCH?" and "MIN PITCH" are separate prompts). The next screen displays "Min ALT?" The minimum altitude may be entered by rotating the knob 113 until the desired minimum altitude is displayed then pressing the knob 113 to accept the value. Thus, the safety criteria are set for use in a training mode as described above. After all settings are entered, the display 111 will show a confirmation screen showing the safety settings that were entered, or the default settings if "NO" was selected. The knob 113 may be pressed momentarily to accept or held for two to three seconds to reenter the settings menu. If the settings are confirmed, and the unit 110 is place in manual training mode, a number will be shown on the display 111 that represents the transmittance setting for the electrooptic material (e.g., in the pilot's visor). The knob 113 is used to manually control the transmittance level. Rotating the knob 113 counterclockwise will dial down the transmittance from 100% toward a minimum of 0% (or bounded by the maximum and minimum transmittance settings for a particular electrooptic material).

If "Auto" is selected when the display 111 shows a prompt for the user to select manual control or automatic control, the safety settings default to roll/bank angle=45 degrees, pitch angle=15 degrees, and altitude=500 feet above the altitude at the time power-supply/control unit 110 is powered on.

Once the safety criteria are set, the display 111 will prompt for the desired type of training event: IIMC or DVE. It will display "Training?" with "IIMC" and "DVE" at the bottom. "IIMC" or "DVE" may be selected by rotating the control knob 113 to appropriately position the cursor and by pressing the control knob 113 to select highlighted option. If "IIMC" is selected the screen will display "Press button to initiate." When the button 115 is pressed, the power-supply/control unit 110 will randomly select when the transmittance will start to change as well as a random, predetermined, or user-selected rate at which it will change. The display 111 will show "press button to end." Once the training is complete, pressing the button 115 will end the session and reset the electrooptic material to maximum transmittance. The display 111 will once again show the "Press button to initiate" screen.

If "DVE" is selected at the "Training?" prompt, the power-supply/control unit 110 will control the altitude at which the transmittance of the electrooptic material begins to change and the rate at which it changes based on ground-speed and altitude along with the dust environment to be simulated, i.e. light, medium or heavy. The display 111 will show "Choose Dust Environment?" and "Light Medium Heavy." The dust environment may be selected by rotating the control knob 113 to highlight the appropriate option, and then pressing the knob 113. After selecting the dust environment to be simulated, the display 111 will show "Press button to initiate." When the button 115 is pressed, the power-supply/control unit 110 will output a voltage to the electrooptic material that is a function of altitude, ground speed, and the selected dust environment. During operation, the display 111 will show "press button to end." Once the training is complete, pressing the button 115 will end the session and reset the electrooptic material to maximum transmittance. The display 111 will once again show the "Press button to initiate" screen.

The power-supply/control unit 110 may be placed in a different mode at any time by pressing the control knob 113 for two to three seconds. The display will read "SET or OFF." The desired option may be selected by rotating the control knob 113 until the appropriate option is highlighted, and then pressing the knob 113. The unit 110 will either go back to the operation mode screen and the user can make the desired selections ("SET") or power down ("OFF").

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. The scope of the invention is defined by the claims which follow.

The invention claimed is:

1. A method for simulating the unexpected onset of reduced-visibility conditions for an aircraft pilot, the method comprising:
   (a) providing a vision-limiting device in an aircraft with a pilot, the vision limiting device comprising:
      (i) an electrooptic material having an optical transmittance, wherein the electrooptic material is disposed to restrict the pilot's view outside the aircraft when the electrooptic material is in a low-optical-transmittance state; and
      (ii) a power supply connected to the electrooptic material;
   (b) changing the output of the power supply to reduce the optical transmittance of the electrooptic material, wherein the changing step is performed independent of the pilot;
   (c) collecting information from at least one flight-safety sensor;
   (d) comparing the information from the at least one flight-safety sensor with a value predetermined to indicate an unsafe operating condition; and
   (e) selectively changing the output of the power supply to increase the optical transmittance of the electrooptic material based on comparing the information from the at least one flight-safety sensor with the value predetermined to indicate an unsafe operating condition.

2. The method of claim 1 wherein the step of changing the output of the power supply to reduce the optical transmittance of the electrooptic material comprises changing the output of the power supply to correspond to a substantially opaque transmittance state of the electrooptic material.

3. The method of claim 1 wherein the step of changing the output of the power supply to reduce the optical transmittance of the electrooptic material comprises changing the output of the power supply according to a predetermined optical-transmittance-versus-time profile.

4. The method of claim 1 wherein the step of collecting information from at least one flight-safety sensor comprises reading at least one sensor not integral to the aircraft.

5. The method of claim 1 wherein the information collected in the step of collecting information from at least one flight-safety sensor includes at least a component of the attitude of the aircraft.

6. The method of claim 1 wherein the step of collecting information from at least one flight-safety sensor comprises reading at least one of the group consisting of a GPS monitor, an accelerometer, a barometer, and an orientation sensor.

7. The method of claim 1 further comprising:
   (a) collecting information indicative of a position of the aircraft; and
   (b) wherein the step of changing the output of the power supply to reduce the optical transmittance of the electrooptic material comprises using the information indicative of a position of the aircraft to change the output of the power supply according to a predetermined optical-transmittance-versus-position profile.

8. A vision-limiting device comprising:
   (a) an electrooptic material having an optical transmittance that can be varied through application of an electrical signal;
   (b) a power supply configured to provide an electrical signal to the electrooptic material; and
   (c) means for providing a signal predetermined to indicate whether a pilot of an aircraft is unsafely disoriented;
   (d) wherein the power supply is configured to provide an electrical signal corresponding to the electrooptic material's maximum-optical-transmittance state based on the signal provided by the means for providing a signal predetermined to indicate whether a pilot of an aircraft is unsafely disoriented.

9. The device of claim 8, wherein the power supply is configured to provide an electrical signal corresponding to the electrooptic material's maximum-optical-transmittance state when the signal provided by the means for providing a signal predetermined to indicate whether a pilot of an aircraft is unsafely disoriented is greater than a predetermined value.

10. The device of claim 8, wherein the power supply is configured to provide an electrical signal corresponding to the electrooptic material's maximum-optical-transmittance state when the signal provided by the means for providing a signal predetermined to indicate whether a pilot of an aircraft is unsafely disoriented indicates that at least a component of the attitude of the aircraft is outside a predetermined range.

11. The device of claim 8 wherein the electrooptic material is embedded in one of the group consisting of an eyeglass lens, a goggle lens, a flight-helmet visor, and a night-vision goggle lens.

12. The device of claim 8 further comprising an optical apparel; wherein the electrooptic material is disposed on the optical apparel.

13. The device of claim 8 wherein the electrooptic material is disposed on an aircraft cockpit window.

14. The device of claim 8 wherein the electrooptic material is disposed in an aircraft cockpit between a seat in the cockpit and a window in the cockpit such as to restrict a pilot's view outside the window when the electrooptic material is in a low-optical-transmittance state.

15. A device for simulating the unexpected onset of reduced-visibility conditions for an aircraft pilot, the device comprising:
   (a) an electrooptic material having an optical transmittance that can be varied through application of an electrical signal;

(b) a programmable-output power supply configured to provide an electrical signal to the electrooptic material;

(c) a GPS monitor configured to provide a signal indicative of a position of an aircraft to the programmable-output power supply; and (d) an orientation sensor configured to provide a signal indicative of at least a component of the attitude of an aircraft to the programmable-output power supply;

(e) wherein the programmable-output power supply is configured to selectively provide an electrical signal to the electrooptic material to increase the optical transmittance of the electrooptic material based on the signal indicative of a position of an aircraft; and (f) wherein the programmable-output power supply is configured to selectively provide an electrical signal to the electrooptic material to increase the optical transmittance of the electrooptic material based on the signal indicative of at least a component of the attitude of an aircraft.

16. The device of claim 15 wherein:

(a) the signal indicative of at least a component of the attitude of an aircraft is a signal indicative of the roll angle of the aircraft; and (b) the programmable-output power supply is configured to provide an electrical signal to the electrooptic material that corresponds to the electrooptic material's maximum-optical-transmittance state if the signal indicative of the roll angle of the aircraft is greater than some predetermined value.

17. The device of claim 15 wherein:

(a) the signal indicative of at least a component of the attitude of an aircraft is a signal indicative of the pitch angle of the aircraft; and (b) the programmable-output power supply is configured to provide an electrical signal to the electrooptic material that corresponds to the electrooptic material's maximum-optical-transmittance state if the signal indicative of the pitch angle of the aircraft is less than some predetermined minimum value or if the signal indicative of the pitch angle of the aircraft is greater than some predetermined maximum value.

18. The device of claim 15 wherein the orientation sensor is one of the group consisting of an accelerometer and a gyroscope.

19. The device of claim 15 wherein the programmable-output power supply is configured to provide an electrical signal to the electrooptic material based on the signal indicative of a position of the aircraft.

20. The device of claim 15 wherein the orientation sensor is the GPS monitor.

* * * * *